United States Patent [19]
Mojonnier et al.

[11] 4,265,167
[45] May 5, 1981

[54] DEOXYGENATING UNIT

[75] Inventors: Harry G. Mojonnier; Sigmund P. Skoli, both of Chicago, Ill.

[73] Assignee: Mojonnier Bros. Co., Chicago, Ill.

[21] Appl. No.: 50,158

[22] Filed: Jun. 20, 1979

Related U.S. Application Data

[63] Continuation of Ser. No. 871,539, Jan. 23, 1978, abandoned.

[51] Int. Cl.³ ............... B01D 19/00; A23L 2/00; B01F 3/04
[52] U.S. Cl. ............... 99/323.2; 55/169; 55/193; 55/196; 55/240; 426/477; 55/166
[58] Field of Search ............ 55/38, 39, 52, 53, 189, 55/193, 240, 186, 196, 198, 342, 343, 166, 169; 99/323.2; 210/86; 261/113, 114 JP; 426/477; 202/158

[56] References Cited

U.S. PATENT DOCUMENTS

| | | | |
|---|---|---|---|
| 516,154 | 3/1894 | Ellis | 202/158 |
| 517,161 | 3/1894 | Hunt | 55/52 |
| 1,851,163 | 3/1932 | Daugherty | 55/189 X |
| 1,970,783 | 8/1934 | Walker | 55/186 X |
| 2,262,313 | 8/1941 | Bostock | 55/193 X |
| 2,457,903 | 1/1949 | Kantor et al. | 55/193 X |
| 2,715,607 | 8/1955 | Lee | 202/158 X |
| 3,246,757 | 4/1966 | Martin | 210/86 |
| 3,466,151 | 9/1969 | Sicard et al. | 202/158 X |
| 3,574,987 | 4/1971 | Skoli et al. | 55/193 |
| 3,584,438 | 6/1971 | Skoli et al. | 55/193 |
| 3,632,315 | 1/1972 | Uitti et al. | 261/113 X |
| 3,705,477 | 12/1972 | Longo et al. | 55/52 X |
| 3,741,552 | 6/1973 | Skoli et al. | 55/39 X |
| 3,832,474 | 8/1974 | Karr | 426/477 |
| 3,928,513 | 12/1975 | Leva | 261/113 |
| 3,960,066 | 6/1976 | LaRocco et al. | 99/323.2 |

FOREIGN PATENT DOCUMENTS

| | | | |
|---|---|---|---|
| 1519979 | 11/1970 | Fed. Rep. of Germany | 55/39 |
| 560462 | 7/1923 | France | 261/113 |
| 939977 | 10/1963 | United Kingdom | 55/39 |
| 951457 | 3/1964 | United Kingdom | 55/52 |

*Primary Examiner*—Robert H. Spitzer
*Attorney, Agent, or Firm*—Trexler, Wolters, Bushnell & Fosse, Ltd.

[57] ABSTRACT

A system for deaerating water is offered for use in brewing beer and the like. The novel system comprises a water-receiving preliminary deaerator, a water flow metering device, and a gas-exchange deaerating column connected to the water flow meter. The deaerating column includes a fluid exhaust pump unit bottom, and mounted atop the pump unit, one or more deoxygenating unit modules. Each deoxygenating unit module includes an outer unit wall, a foraminous retainer baffle sheet bottom, and a stack member extending upwardly from the baffle sheet. Together, the wall, sheet and stack form a foraminous-bottomed retainer for retaining a continuous layer of water. Below the retainer is a basin having another foraminous bottom for temporarily retaining liquid falling from the retainer baffle sheet above. The basin and retainer are so constructed as to require gas, which passes into the unit at the column bottom, to flow upwardly through the column units in a serpentine path and to undergo intimate mixture with the downwardly falling water droplets. This intimate gas-water mixing drives out air dissolved or otherwise contained within the water, and reduces the level of air retained within the water to a level on the order of one or two parts of air per billion parts of water. The thus-deaerated water is then routed to a proportioner for mixing with Strong Brew; the mix is transferred to a carbonator and cooler and is then transferred to storage or other downstream processing units.

12 Claims, 5 Drawing Figures

DEOXYGENATING UNIT

This is a continuation of application Ser. No. 871,539, filed Jan. 23, 1978 now abandoned.

BACKGROUND OF THE INVENTION

This invention relates generally to deaerating or deoxygenating apparatus, and more particularly concerns apparatus for removing oxygen from water to be used in the manufacturing or brewing of beer.

Modern methods of preparing beer and other beverages require the use of deaerated or deoxygenated water. Deoxygenation improves beverage stability during its preparation and during the filling process, and during storage prior to consumption. If the beverage is contained within a can, inclusion of air can permit deterioration of the plastic can lining, thereby damaging the can and spoiling the flavor of the beverage.

In many modern beverage preparation systems, deaeration apparatus is provided. Such deaerators are described in U.S. Pat. Nos. 3,584,438 and 3,574,587, and in co-pending U.S. patent application Ser. No. 821,215 filed Aug. 2, 1977 now U.S. Pat. No. 4,112,828. These devices reduce air contained within the water to amounts on the order of a few parts per million.

While this level of deoxygenation is effective for soft drink beverages and the like, the air content must be reduced to a considerably lower level if the water is to be used in preparation or brewing of beer. In beer preparation, presence of air in a ratio of more than a very few parts per billion can result in an unacceptable end product.

Previously offered deaeration or deoxygenation apparatus for use in beer breweries have been relatively expensive, bulky, and, in some cases, ineffective. Virtually all such apparatus must be custom built; that is, the apparatus must be laboriously constructed, piece by piece, at the location where the apparatus will be used. If this apparatus is to be constructed within a presently-operating brewery, considerable disruption to production operations can result.

It is accordingly the general object of the present invention to provide efficient, effective apparatus for deaerating or deoxygenating water to be used in the brewing of beer.

More specifically, it is the object of the present invention to provide efficient, effective apparatus for deoxygenating or deaerating water so as to provide water having an oxygen content on the order of one or two parts of oxygen per billion parts of water.

Another object is to provide such apparatus in modular form for relatively easy and quick yet customized final construction.

Yet another object is to provide a deaeration or deoxygenating apparatus which will thoroughly mix a gas, such as carbon dioxide, with the treated water so as to thoroughly drive out any air and oxygen dissolved or otherwise trapped within the water.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
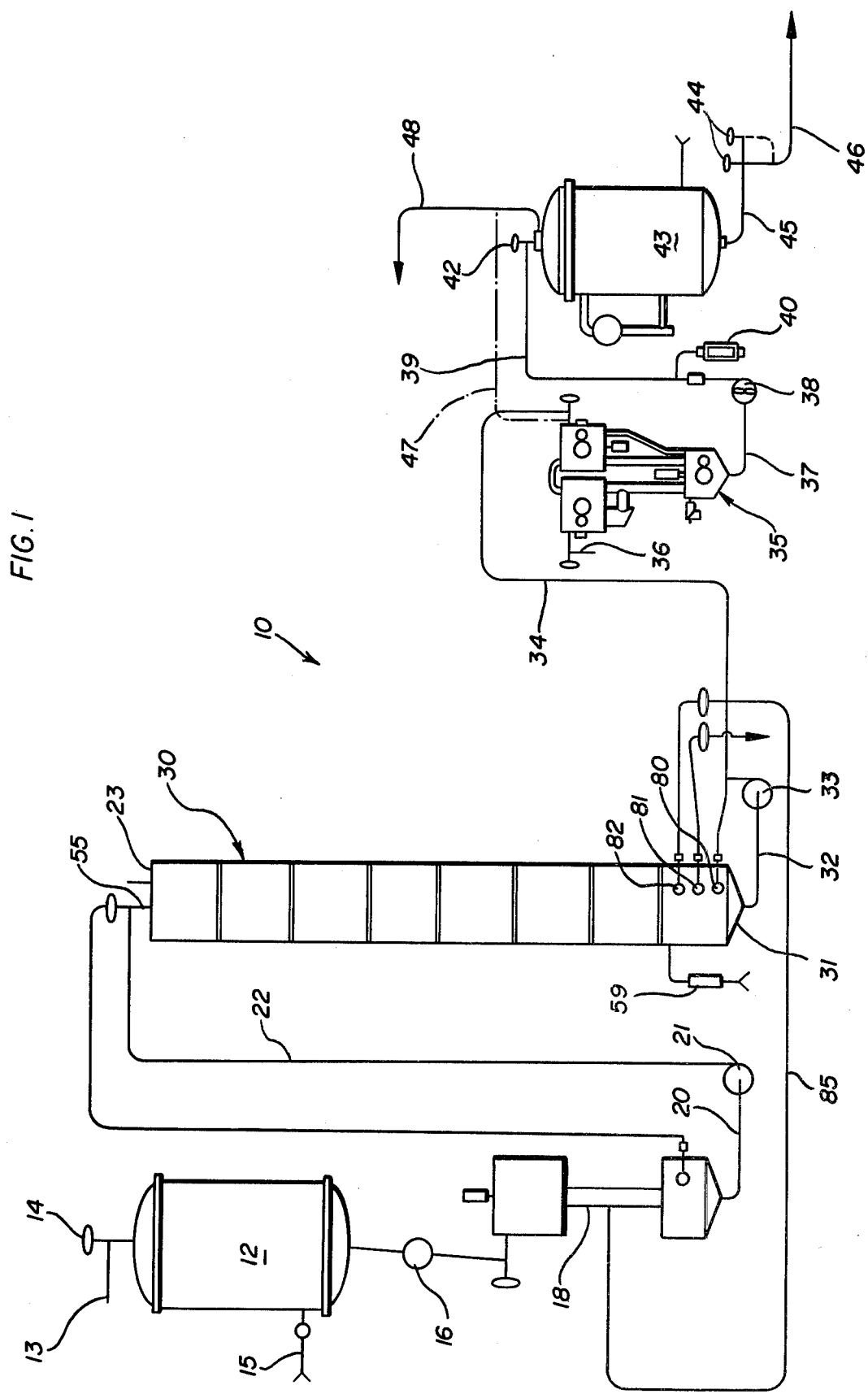
FIG. 1 is a diagram showing, in somewhat schematic form, a novel system for preliminarily preparing water to be used in the production of beer, the system including a novel deaerating or deoxygenating column.

Turning first to FIG. 1, there is shown a system 10 for deaerating or deoxygenating water, and for mixing the deoxygenated water with Strong Brew, a beer concentrate, and for then cooling and carbonating liquid mix. Here, a vessel 12 receives water from a remote source (not shown) through an inlet line 13 controlled by a valve 14. Preliminary cooling and deoxygenation or deaeration occurs within this vessel 12, and a quantity of carbon dioxide gas is introduced through an inlet line 15. A pump 16 routes the cooled, preliminarily deaerated water to a flow metering device 18 which provides a constant, carefully controlled flow of fluid through the remaining portions of the system.

Water is routed from the flow metering device 18 through a metering device exhaust line 20, a pressurizing pump 21, and a deoxygenating column inlet line 22, to the top 23 of the deoxygenating column 30. At the bottom 31 of the column 30, water is drawn through a column exhaust line 32 and a pump 33 to a transfer line 34 which carries the water to a proportioner device 35. Beer concentrate, or Strong Brew, is introduced to the proportioner 35 from a remote source (not shown) through a valved inlet line 36.

The now-mixed beer beverage is drawn by a proportioner exhaust line 37 and a pressurizing pump 38 to a transfer line 39. Additional carbon dioxide can be introduced into this line 39 through a carbon dioxide injector 40. The preliminarily carbonated beverage is then introduced, through a valve 42, to a unitized carbonator and cooler vessel 43. The cooled, carbonated beer beverage is then routed through valves 44 and an exhaust line 45 to a transfer line 46 for delivery to storage (not shown) and subsequent handling.

Carbon dioxide not absorbed in the carbonator and cooler vessel 43 can be transferred by a reflux line 47, to the proportioner for preliminarily carbonating the water and Strong Brew. If desired, additional reflux lines 48 can be provided to deliver carbon dioxide to other, upstream portions of the system. In accordance with the invention, this reflux deaeration and carbonation helps discourage air from leaking into the deaerated water, maintains or increases the amount of carbon dioxide in the water, and helps stabilize the water and end product.

In accordance with another aspect of the invention, the deoxygenating or deaerating column 30 is highly efficient, removing all but a few parts of air per billion parts of water, yet is of modular construction to permit easy, inexpensive assembly on site. To this end, the deoxygenating column 30 includes a bottom pump unit 50 and one or more deoxygenating unit modules 51, 52 and 53 mounted atop the pump unit 50. The number of modules 51–53 mounted atop the pump unit 50 are determined by the amount of deoxygenation to be accomplished, and by the amount of space available between the column site floor or foundation and any overhead obstructions. As illustrated especially in FIGS. 2 and 3, water is introduced to the unit 30 through a top inlet 55 and, generally speaking, falls downwardly through the unit to the exhaust pump module 50. Carbon dioxide is introduced through a metering device 59 from a remote source and flows generally upwardly to the column top 23. This counterflow arrangement encourages highly effective deaeration.

Figure 3:
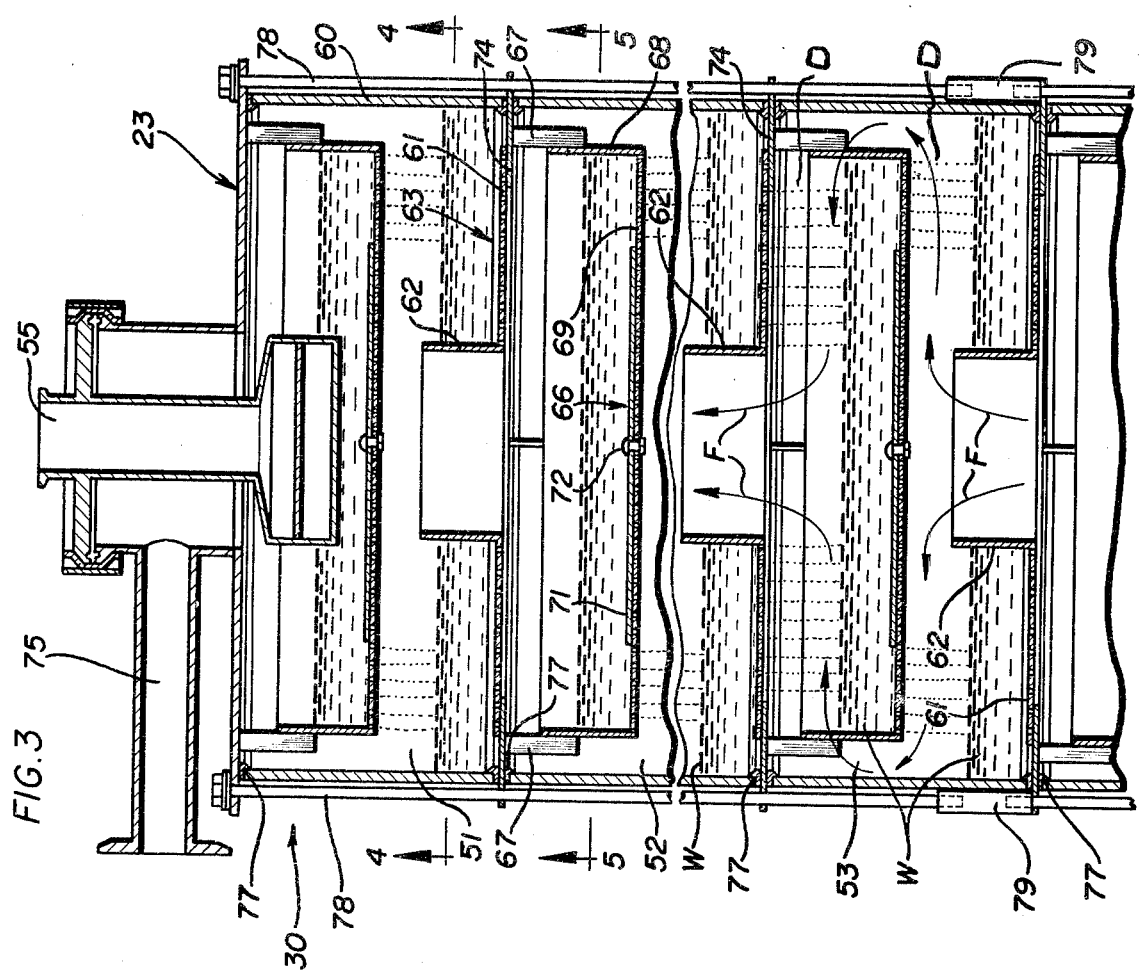
FIG. 3 is a fragmentary sectional view showing the interior of the top portion of the deoxygenating column shown in FIG. 2.
Figure 4:
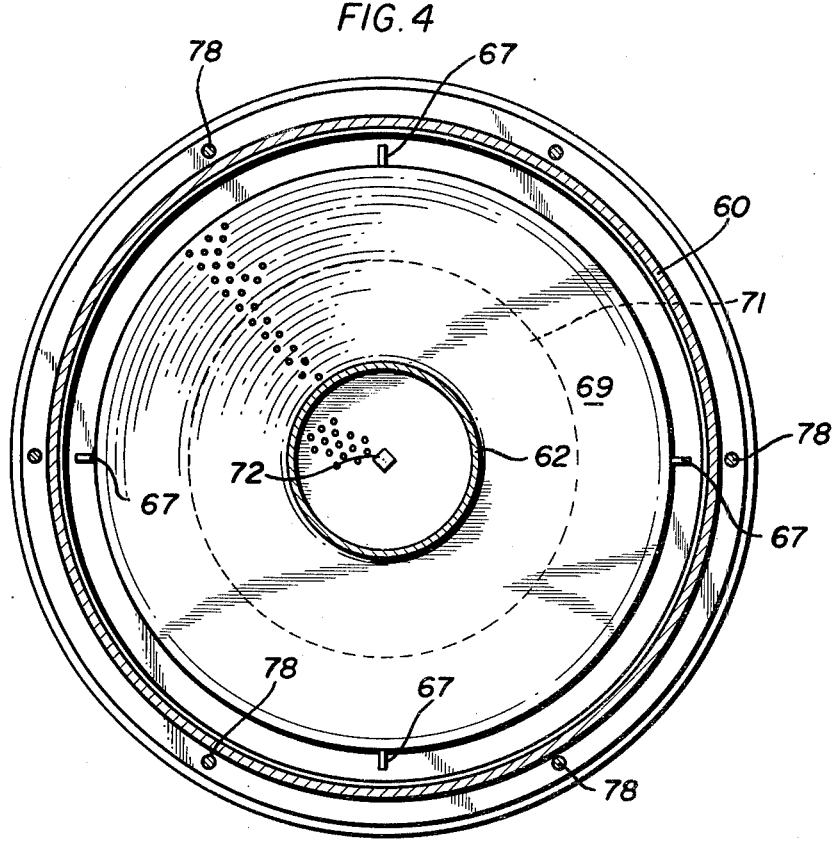
FIG. 4 is a sectional view taken substantially in the plane of line 4—4 in FIG. 3.
Figure 5:
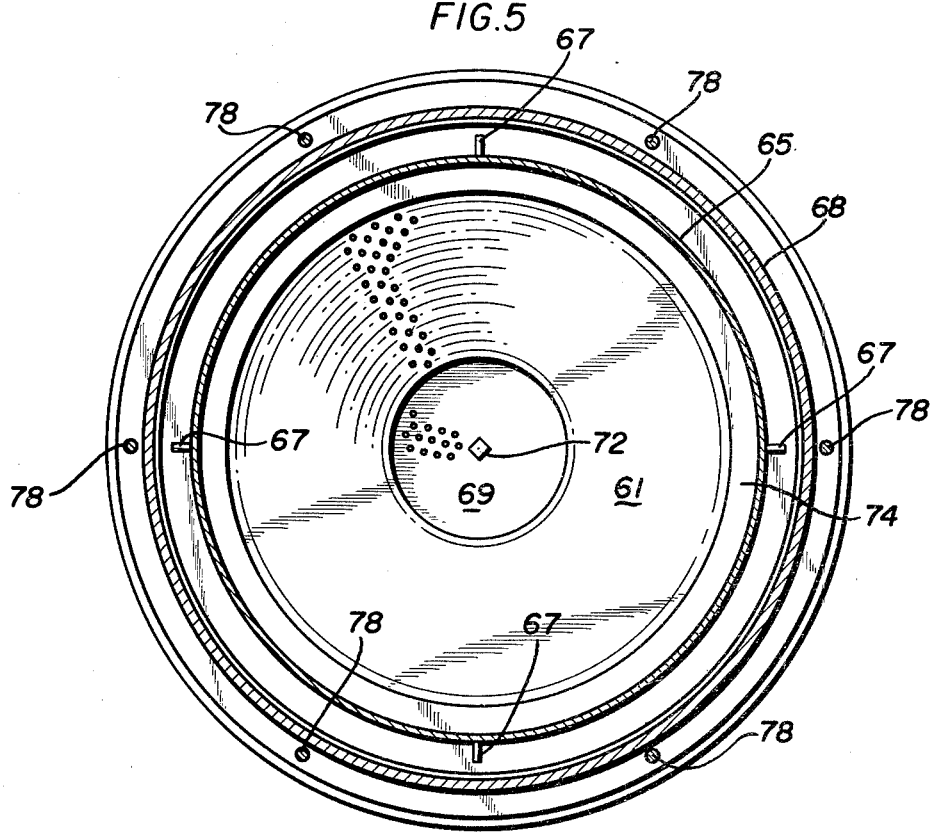
FIG. 5 is a sectional view taken substantially in the plane of line 5—5 in FIG. 3.

More specifically, to accomplish this highly effective deaeration in accordance with the invention, each unit 51–53 includes an outer wall 60 and a foraminous baffle sheet 61 extending inwardly from that wall 60 as shown in FIGS. 3-5. A stack member 62, here centrally located, extends upwardly from the baffle sheet 61. Together, the wall 60, sheet 61 and stack 62 form an annular, foraminous-bottomed retainer 63 for temporarily retaining a continuous layer or quantity of water W, as most particularly illustrated in FIG. 3. It will be understood that this layer of water W is not quiescent, but is dynamically stable; that is, water falls into the retainer 63 and water layer W from upper parts of the column at substantially the same rate as water is lost from the layer through the bottom sheet 61.

Below the sheet 61 and stacks 62, a basin 66 is mounted, as upon legs 67. This basin 66, located inside the outer wall 60, is here defined by an annular outer basin wall 68 and a foraminous bottom sheet member 69 for temporarily retaining liquid falling from the baffle sheet 61 located immediately above the basin. Again, the basin 66 contains a continuous layer or quantity of water W, and is substantially dynamically stable.

To adjust the effective open area of the basin bottom sheet 69 and to prohibit liquid from falling directly to and through the stack member 62 located below the basin 66, a mask plate 71 is secured, as by a bolt 72 or other convenient means, over the central portion of the basin foraminous bottom 69. An annular mask sheet 74 is secured about the outer periphery of the retainer bottom sheet 61. By adjusting the size of these mask sheets 71 and 74 in relation to the associated foraminous sheets 61 and 69, the volume and rate of water being processed by the column can be correspondingly adjusted.

Figure 2:
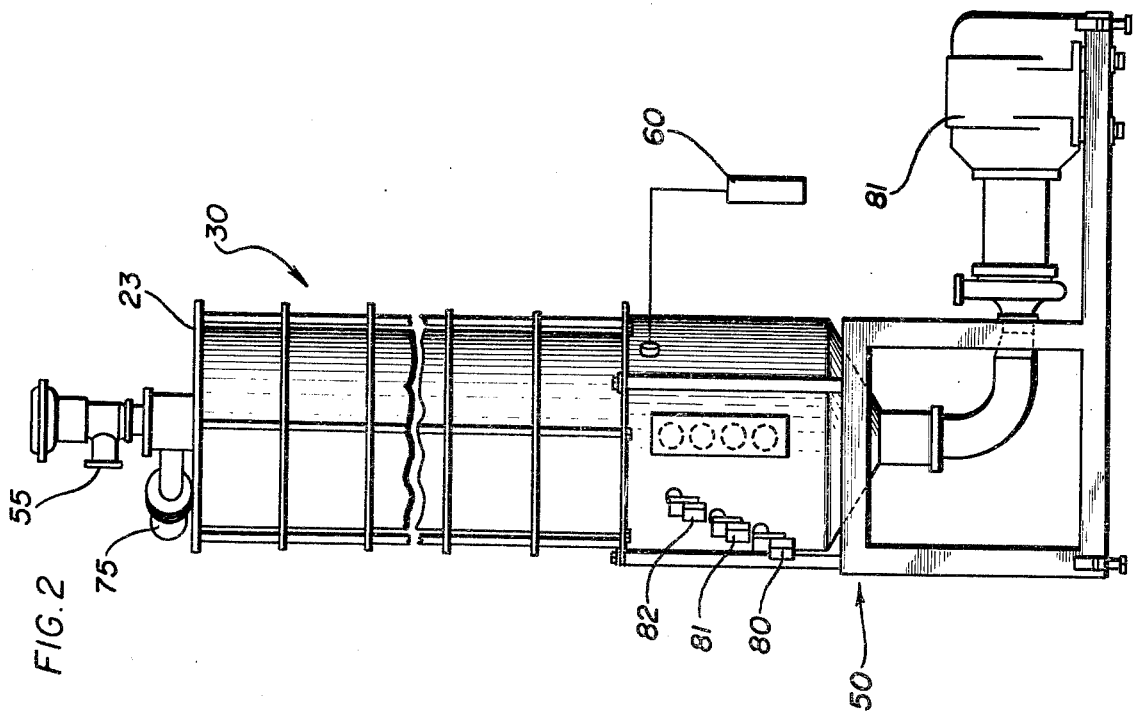
FIG. 2 is an elevational side view showing the deoxygenating column of FIG. 1.

As shown in FIGS. 1 and 2, carbon dioxide gas, introduced into the bottom-most or pump unit module 50 through the meter 59, is exhausted through a carbon dioxide exhaust outlet pipe 75 mounted atop the unit. Thus, as the carbon dioxide gas flows upwardly through the unit 30, it is forced by the solid layers of water W—which are in alternating, extended annular and compact, non-annular array—to follow a serpentine path as illustrated by the arrows F in FIG. 3. Moreover, as the gas flows upwardly in this serpentine path, the gas passes through vertically stacked or arrayed curtains of falling, finely divided water droplets D. This close, intermittent intermixing of upwardly rising carbon dioxide gas and the downwardly falling water provides extensive gas-water intermixing. The extensive gas-water intermixing provides, in turn, virtually complete exchange of carbon dioxide gas for the oxygen-containing air previously dissolved within the water. Moreover, as the water falls downwardly through the unit and approaches the bottom water-exhausting pump unit 50, and the carbon dioxide inlet 59, the water is subjected to ever-purer concentrations of carbon dioxide gas. Oxygen replacement with carbon dioxide is yet further encouraged by operating the column at a positive pressure on the order of 23 p.s.i.g., for example.

In accordance with another aspect of the invention, these deaeration unit modules 51–53 can be stacked atop one another and interconnected, as by inter-connector rods 78 and couplings 79, to provide the desired column rigidity and provide the desired deaeration effect. Gaskets 77 insure water- and gas-tight seals between column modules.

To further control the water flowing through the deoxygenating or deaerating column 30, switches can be provided on the pump module 50. A first switch 80 provides a low level control to halt operation of the pump module 50 and thereby permit the water level to rise within the column 30. A second switch 81 can be used to direct deoxygenated water away from the downstream portions of the system shown in FIG. 1 and to other apparatus such as a diatomatious earth filter for use in washing the filter. A third switch 82 can be used as a high level control so as to operate a recirculation line 85 and route water from the deoxygenating column 30 back to the flow meter 18 if the demand for water by the downstream proportioner 35 is reduced for any reason.

The following is claimed as invention:

1. A modular gas-exchange deoxygenating column for removing oxygen-containing air from water, comprising, in combination, a water exhaust pump bottom unit, water level control means mounted in and on the pump bottom unit for controlling the water level therein, a plurality of deoxygenating units separably mounted atop the pump bottom unit in vertical array, interconnector rod means interconnecting the units, each deoxygenating unit including an outer unit wall, a foraminous baffle sheet extending inwardly from the wall, and a stack member extending upwardly from the baffle sheet, the wall, sheet and stack together forming a foraminous-bottomed retainer for temporarily retaining water, the retained water forming a first gas barrier, and the water falling from the foraminous sheet being brought into first intimate contact with upwardly flowing gas and metering device means for introducing carbon dioxide gas into the column at a positive pressure, so as to provide virtually complete exchange of carbon dioxide for the oxygen-containing air previously dissolved in the water.

2. A deoxygenating column according to claim 1, wherein said deoxygenating unit further includes a basin mounted below the retainer baffle sheet and stack, the basin having a foraminous basin bottom for temporarily retaining liquid falling from the baffle sheet above and forming a second gas barrier, and the liquid falling from the foraminous basin bottom being brought into second intimate contact with the upwardly flowing gas.

3. A deoxygenating column according to claim 2 wherein said outer basin wall is located inside the outer unit wall, the basin and retainer, together with the retainer liquid barriers, thus forming a serpentine flow path for upwardly moving gasses, and also forming, when carrying liquid, two curtains of downwardly falling liquid droplets for bringing the liquid into intimate, gas-exchanging contact with the gas so as to substitute that gas for air originally dissolved in the liquid.

4. A deoxygenating column according to claim 1, each deoxygenating unit including mask means for masking the flow of water through the foraminous baffle sheet, the mask means being carried by its basin in a position to deflect the gasses flowing upwardly through the stack of the unit below.

5. A gas-exchange deoxygenating column according to claim 1 including annular mask means for masking the flow of water through the foraminous baffle sheet, the mask means extending inwardly from said outer unit wall to a point located radially inwardly of the basin wall so as to encourage serpentine gas flow through the unit and column.

6. A system for deaerating water to be used in brewing beer and the like, the system comprising water flow control means for providing an even flow of water, a gas-exchange deaerating column connected to the water flow control means for receiving water therefrom and comprising a liquid exhaust pump unit bottom, water level control means mounted in and on the pump unit for controlling the water level therein and a plurality of deoxygenating unit modules separably mounted atop the pump unit in vertical array, interconnector rod means interconnecting the column units, each deoxygenating unit module including an outer unit wall, a foraminous retainer baffle sheet extending inwardly from the wall and a stack member extending upwardly from the baffle sheet, the wall, sheet and stack together forming a foraminous-bottomed retainer for temporarily retaining a layer of water, the column further including metering device means for introducing carbon dioxide gas into the column at a positive pressure so as to provide virtually complete exchange of carbon dioxide for the oxygen-containing air previously dissolved in the water.

7. A system according to claim 6 wherein the deoxygenating unit module further includes a basin mounted below said retainer baffle sheet and stack, the basin having a foraminous bottom for temporarily retaining liquid falling from the retainer baffle sheet above.

8. A system according to claim 6 wherein said deaerating pump unit includes high level control means connected to the flow control means for directing fluid back to the flow control means should the water level in the deaerating column pump unit rise above a preset limit.

9. A system according to claim 6 wherein said deaerating column pump unit means includes diverter valve means for routing deaerated water away from said system and to other equipment.

10. A system according to claim 6 including low fluid level alarm means for providing an alarm should the fluid level in the pump unit fall below a pre-determined minimum level.

11. A system according to claim 6 including proportioner means connected to said deaerating column for receiving deaerated water therefrom, and connected to a source of Strong Brew for receiving Strong Brew therefrom, and for forming a mix of the water and Strong Brew and combination carbonator and cooler unit means connected to said proportioner means for receiving mix from the proportioner means and for carbonating and cooling said mix.

12. A system according to claim 11 including reflux line means leading from said carbonator and cooler unit means to said proportioner for providing carbon dioxide gas to said proportioner to encourage further mix carbonation and to discourage aeration of the mix.

* * * * *